Patented Aug. 19, 1924.

1,505,560

UNITED STATES PATENT OFFICE.

ADOLF GRÜN, OF AUSSIG, CZECHOSLOVAKIA, ASSIGNOR OF ONE-HALF TO THE FIRM GEORG SCHICHT, A.-G., OF AUSSIG, CZECHOSLOVAKIA.

METHOD OF MANUFACTURING NUTRITIOUS FATS.

No Drawing. Application filed April 5, 1921. Serial No. 458,855.

*To all whom it may concern:*

Be it known that I, Dr. ADOLF GRÜN, chemist, a citizen of the Austrian Republic, residing at Aussig, in the Czechoslovakian Republic, have invented certain new and useful Improvements in Methods of Manufacturing Nutritious Fats, of which the following is a specification.

My invention relates to a method of manufacturing nutritious fats. The hitherto manufactured nutritious fats such as margarine or artificial lard, differ from the natural fats, such as butter or lard, in their chemical composition. It is well known that by mixing various fats nutritious-fats are obtained which contain the same fatty acids as a natural nutritive-fat, and further, that by a suitable mixture the same quantitative proportion of the single fatty acids or the same consistency of the fast as in a natural product can be obtained. However, such a mixture of fats still differs distinctly from the natural fat which is to be imitated as the mixture does not contain the same combined glycerides. It has, for instance, been proposed to add simple glycerides of the lower fatty acids. e. g. tributyrine, tricapronine, or the like, to the fats in order to obtain mixtures of the kind of natural butter. But the latter does not contain the lower fatty acid in the form of simple monoscidized glycerides, but a combination of lower and higher fatty acids which form mixed triglycerides. Therefore, the simple triglycerides of the lower fatty acids, thin liquids of an exceedingly bitter taste, are quite useless in the manufacturing of a synthetic butter fat.

There have been discovered several methods of producing mixed triglycerides in laboratories, however they are far too intricate and expensive to permit their commercial use. The discovery of a practical method of manufacturing mixed glycerides has remained an unsolved problem.

Now it has been found that, independently of the hitherto known intricate processes, mixed glycerides of any kind or mixtures of them as they exist in the natural product can be synthetically produced in a simple manner. The new process consists in this that neutral fats converted into mono- or diglycerides by means of heating them together with glycerine, whereupon these glycerides by being esterified with a fatty acid not contained in the original neutral fat or with a mixture of such fatty acids are converted into mixed glycerides. In this way starting with a simple triglyceride one can produce a mixed triglyceride, for instance from tristearine may be derived mono- or distearine from which the stearodibutyrine may be obtained. In the same manner a neutral fat or a mixture of such fats containing a plurality of simple triglycerides (it may also combine mixed triglycerides) can be converted, by esterification with the calculated quantity of glycerine, into a mixture of several mono- or diglycerides or a mixture of both of them, and this mixture, by esterification with fatty acids can be further converted into a mixture of many mixed triglycerides. By this method it is possible to obtain in one process a complicated mixture of mixed glycerides wherein, as in the natural fats the fatty acids are combined in any possible manner. If starting with an acid fat, that is a mixture of neutral fat and fatty acids, in order to obtain the same effect it is only necessary to employ a larger quantity of glycerine according to the quantity of free acids. Of course, also free fatty acids of any kind may be added to a neutral fat, whereupon the mixture is treated with glycerine in the manner mentioned above. In a somewhat less perfect manner the process also may be carried out through the esterification with glycerine of a mixture of various free fatty acids, for instance volatile and non-volatile fatty acids, for it has been discovered that the volatile acids, e. g. butyric acid, under the same conditions of reaction as the fatty acids of a much higher boiling-point can be esterified when mixed therewith. There are found, of course certain amounts of simple triglycerides, which, however, if desired, by treatment in the above described manner, can be converted into mixed triglycerides, or can be removed by solvents (e. g. tributyrin trivalerin etc.) by extraction with alcohol.

The conversion of triglyceride into mono- and diglycerides as well as the esterification of the fatty acids with mono- and diglycerides or with glycerine can be expedited by the use of catalyzers. As catalyzers are used the well known dehydrogenating catalyzers, such as acids, e. g. naphthaline-sulfonic-acid, acid salts, bases, but especially metals, such as tin, zinc, aluminium or the like. The catalyzer may be applied in the first stage of the reaction or in the second, or also in both stages.

The process may be applied to natural fats and fatty acids separated therefrom as well as to fats converted by hydrogenization, polymerization, oxidation etc., and also fatty acids produced by synthesis e. g. by oxidation of other fatty acids or hydrocarbons, by melting with caustic alcali by biochemical processes, or the like. The process is especially useful for the improvement of hardened fats which contain large amounts of tristearine, tribehenine and the like.

In order to make the nutritious fats produced by this process completely equivalent to the natural products, the quantity of the accompanying substances such as sterines or phosphatides—may be adapted to the quantity of these substances contained in the natural products e. g. by adding the necessary amounts of cholesterin, lecithin or the like to the products or raw-materials. In the same manner, any other accompanying substances of the natural product may be added to the finished product. In the manufacture of artificial butter for instance the natural coloring substances carotine and xanthophille which may be obtained from many natural products can be added, as well as vitamines.

1st example.

500 kilogrammes of palm-oil are heated to 225–230° C. in an evacuated stirring apparatus in the presence of 25 kilogrammes of tin together with somewhat more than the quantity of glycerin as calculated from the saponification value necessary for the production of diglycerides, that is 27 kilogrammes until the glycerin is substantially completely consumed. Now the calculated quantity of a mixture of volatile fatty acids consisting of about 2 moles butyric acid and 1 mole capronic-acid i. e. in round figures 83 kilogrammes is added and further heated until the acid-number has sunk to a few degrees or to zero. The neutral product shows the saponification value of about 250. It is refined and treated in the manner usual in the nutritive fat industry.

2nd example.

500 kilogrammes of hydrogenated palm-oil are treated in the same manner as described in the first example.

3rd example.

A mixture of 500 kilogrammes of tallow and about 30 kilogrammes of butyric acid is heated together with 25 kilogrammes of glycerin in the presence of 10 kilogrammes of tin, until the glycerin has been completely absorbed; then 135 kilogrammes of oleic acid are added and heated under a reduced pressure, until the reaction mixture is almost neutral.

4th example.

500 kilogrammes of tallow are heated with 15 kilogrammes of glyercin, until the glycerin has been absorbed; thereupon, 42 kilogrammes of butyric acid are added and heated, until the mixture is almost neutral.

5th example.

A mixture of 400 kilogrammes of hardened linseed oil and 100 kilogrammes of cocoanut oil is heated, in the presence of 10 kilogrammes of tin together with 25 kilogrammes of glycerin until the latter has been completely absorbed, then, a mixture of 28 kilogrammes of butyric acid and 140 kilogrammes of oleic acid are added and heated, until the mixture is almost neutral.

I claim as my invention:

1. The process of producing nutritious fats which consists in heating neutral fats containing triglycerides together with glycerin until mono- and diglycerides are formed, and then converting these mono- and diglycerides into mixed triglycerides by heating with free fatty acids.

2. The process of producing nutritious fats, which consists in heating fats comprising a mixture of simple triglycerides and free fatty acids together with a surplus of glycerin until mono- and diglycerides are formed, and then converting these mono- and diglycerides into mixed triglycerides by heating with free fatty acids.

3. The process of producing nutritious fats, which consists in heating neutral fats containing triglycerides together with glycerin until mono- and diglycerides are formed, and then converting these mono- and diglycerides into mixed glycerides by heating with free unsaturated fatty acids.

4. The process of producing nutritious fats, which consists in heating neutral fats containing triglycerides together with glycerin until mono- and diglycerides are formed, and then converting these mono- and diglycerides into mixed glycerides by heating with free saturated fatty acids.

5. The process of producing nutritious fats, which consists in heating neutral fats containing triglycerides together with glycerin until mono- and diglycerides are formed, and then converting these mono- and diglycerides into mixed glycerides by heating with free volatile fatty acids.

6. The process of producing nutritious fats, which consists in heating neutral fats containing triglycerides together with glycerin until mono- and diglycerides are formed, and then converting these monoand diglycerides into mixed glycerides by heating with free fatty acids.

7. The process of producing nutritious fats, which consists in heating neutral fats containing triglycerides together with glycerin until mono- and diglycerides are formed, and then converting these mono- and diglycerides into mixed glycerides by heating with free fatty acids in the presence of an esterifying agent.

8. The process of producing nutritious fats, which consists in heating neutral fats containing triglycerides together with glycerin until mono- and diglycerides are formed, and then converting these mono- and diglycerides into mixed glycerides by heating with free fatty acids in the presence of an esterifying agent.

9. The process of producing nutritious fats, which consists in heating neutral fats containing triglycerides together with glycerin until mono- and diglycerides are formed, and then converting these mono- and diglycerides into mixed glycerides by heating together with free fatty acids in the presence of an esterifying agent.

In testimony whereof I affix my signature in presence of two witnesses.

Dr. ADOLF GRÜN.

Witnesses:
D. Hüttuis,
Gustav Bohao.